US011300767B2

(12) United States Patent
Kalinin et al.

(10) Patent No.: US 11,300,767 B2
(45) Date of Patent: Apr. 12, 2022

(54) METHOD FOR HIGH-RESOLUTION SCANNING MICROSCOPY

(71) Applicant: CARL ZEISS MICROSCOPY GMBH, Jena (DE)

(72) Inventors: Stanislav Kalinin, Weimar (DE); Volodymyr Kudryavtsev, Jena (DE); Thomas Egloff, Jena (DE); Alexander Kolarow, Jena (DE); Joerg Engel, Weida (DE)

(73) Assignee: Carl Zeiss Microscopy GmbH, Jena (DE)

( * ) Notice: Subject to any disclaimer, the term of this patent is extended or adjusted under 35 U.S.C. 154(b) by 139 days.

(21) Appl. No.: 16/823,624

(22) Filed: Mar. 19, 2020

(65) Prior Publication Data

US 2020/0301121 A1 Sep. 24, 2020

(30) Foreign Application Priority Data

Mar. 21, 2019 (DE) ...................... 10 2019 107 267.0

(51) Int. Cl.
*G02B 21/06* (2006.01)
*G02B 21/00* (2006.01)
*G02B 21/36* (2006.01)

(52) U.S. Cl.
CPC ....... *G02B 21/0072* (2013.01); *G02B 21/008* (2013.01); *G02B 21/0032* (2013.01); *G02B 21/367* (2013.01)

(58) Field of Classification Search
CPC ............ G02B 21/0072; G02B 21/0032; G02B 21/008; G02B 21/367; G02B 21/00;
(Continued)

(56) References Cited

U.S. PATENT DOCUMENTS 8,705,172 B2 4/2014 Kleppe et al.
2007/0146472 A1 6/2007 Steinert
(Continued)

FOREIGN PATENT DOCUMENTS

DE 10 2014 111 167 A1 2/2016
DE 10 2015 116 598 A1 3/2017
(Continued)

OTHER PUBLICATIONS

Huff, Joseph, et al.; "The Airyscan Detector from ZEISS—Confocal Imaging with Improved Signal-to-Noise Ratio and Superresolution"; Technology Note, Jul. 2015; 1-18.
(Continued)

*Primary Examiner* — Arnel C Lavarias
(74) *Attorney, Agent, or Firm* — Duane Morris LLP (57) ABSTRACT

A method for high-resolution scanning microscopy of a sample, wherein the sample is illuminated with illumination light such that the illumination light is focused at a point in or on the sample into an illumination spot. The point is imaged into a diffraction image onto an area detector having detector elements. The area detector has a spatial resolution that resolves a diffraction structure of the diffraction image. The sample is here scanned line-wise in a grid made of rows and columns by displacing the point relative to the sample into different scanning positions with an increment width that is smaller than the diameter of the illumination spot. The area detector is read, and an image of the sample is generated from the data of the area detector and from the scanning positions assigned to said data, said image having a resolution that is increased beyond a resolution limit for imaging.

6 Claims, 3 Drawing Sheets

(58) Field of Classification Search
CPC .............. G02B 21/0004; G02B 21/002; G02B 21/0024; G02B 21/0036; G02B 21/0052; G02B 21/006; G02B 21/0076; G02B 21/06; G02B 21/36; G02B 21/361; G02B 21/365
USPC ........ 359/385, 362, 363, 368, 369, 388, 389
See application file for complete search history.

(56) References Cited

U.S. PATENT DOCUMENTS

| | | |
|---|---|---|
| 2011/0267688 A1 | 11/2011 | Kleppe et al. |
| 2012/0057446 A1 | 3/2012 | Patland et al. |
| 2014/0146376 A1* | 5/2014 | Kleppe .............. G02B 21/0072 359/212.1 |
| 2017/0227749 A1 | 8/2017 | Kleppe et al. |
| 2018/0321154 A1 | 11/2018 | Podgorski et al. |
| 2019/0056580 A1* | 2/2019 | Kleppe ................ G02B 21/361 |
| 2019/0064495 A1* | 2/2019 | Kleppe ................ G02B 27/58 |
| 2019/0121155 A1* | 4/2019 | Yu ...................... G01N 21/6458 |
| 2019/0324242 A1* | 10/2019 | Boersch ............. G02B 21/0076 |
| 2020/0116987 A1* | 4/2020 | Kleppe ................ G02B 21/361 |
| 2020/0218047 A1* | 7/2020 | Kleppe ............. G02B 21/0076 |

FOREIGN PATENT DOCUMENTS

| | | |
|---|---|---|
| DE | 10 2017 122 858 A1 | 4/2019 |
| EP | 2 317 362 A1 | 5/2011 |
| WO | 2005 064 913 A1 | 7/2005 |
| WO | 2010 101 894 A2 | 9/2010 |
| WO | 2019 068 519 A1 | 4/2019 |

OTHER PUBLICATIONS

Carl Zeiss Microscopy GmbH; "Zeiss LSM 980 with Airyscan 2—Your Next Generation Confocal for Fast and Gentle Multiplex Imaging"; Product Information, Version 1.0, Oct. 2018; 1-33.
German Search Report dated Jul. 5, 2019.
Weisshart, Klaus.; "The Basic Principle of Airyscanning"; Technology Note, Jul. 2014; 1-22.
European Search Report for EP 20 162367.5 dated Aug. 17, 2020.

* cited by examiner

METHOD FOR HIGH-RESOLUTION SCANNING MICROSCOPY

RELATED APPLICATIONS

The present application claims priority benefit of German Application No. DE 10 2019 107 267.0 filed on Mar. 21, 2019, the contents of which are incorporated by reference in its entirety.

FIELD OF THE INVENTION

The invention relates to a method for high-resolution scanning microscopy of a sample, wherein the sample is illuminated with illumination light such that the illumination light is focused at a point in or on the sample into a preferably diffraction-limited illumination spot. The point is then imaged into a diffraction image onto an area detector having pixels, with the imaging being diffraction-limited if the illumination spot is diffraction-limited. Owing to the pixels thereof, the area detector has a spatial resolution that resolves a diffraction structure of the diffraction image. The sample is then scanned line-wise in a grid made of rows and columns by displacing the point relative to the sample into different scanning positions with an increment width that is smaller than the diameter of the illumination spot. In particular in the case of what are known as multiplex recordings, the illumination spot is greater than diffraction-limited in one direction, that of the columns, which means that a plurality of rows can be scanned simultaneously. In each scanning position, an image is recorded with the area detector. After every recording, the area detector is read. An image of the sample is then generated from the data of the area detector and from the scanning positions assigned to said data, said image having a resolution that is increased beyond a resolution limit for imaging.

DESCRIPTION OF THE INVENTION

A traditional implementation of light microscopy is laser scanning microscopy (LSM), which uses a confocal detection arrangement to image only that plane of the sample that is situated in the focal plane of the objective. Obtained is an optical section, the thickness of which depends on the size of the confocal stop. The recording of multiple optical sections at different depths of the sample permits the generation of a three-dimensional image of the sample, which is then made up of the different optical sections. It is thus also possible using LSM to examine thicker samples.

In principle, the optical resolution of a light microscope is diffraction-limited by physical laws. The term "high-resolution" below will be understood to mean a resolution beyond said diffraction limit. Various methods for overcoming said diffraction limit are known in the prior art. One of these methods is what is known as Airyscan microscopy, as is described for example in EP 2 317 362 A1. This document combines, in the embodiment illustrated and described in FIG. 5 therein, diffraction-limited illumination of the sample with an area detector, wherein the scanning device used therein is embodied such that the diffraction image of the point that is illuminated with the illumination spot is static on the area detector—such an arrangement of the detector is also referred to as "de-scanned." In general, a scanner that deflects the beam path is to this end arranged between the sample and the combination point of illumination device and imaging device. Such a scanner acts both on the illumination spot and on the imaging of the point that is illuminated with the illumination spot, with the result that the beam path in the imaging direction after the scanner is static. An alternative to such a scanner is the use of a movable sample stage which displaces the sample. The diffraction image is static on the area detector even then. According to the concept of EP 2 317 362 A1, the area detector is provided with a spatial resolution that permits the resolution of the structure of the diffraction image.

While in the traditional laser scanning microscope a combination of pinhole and detector is used, what is known as an Airyscan detector is used in the present case, which is an area detector having a large number of detector elements, which can be embodied for example hexagonally and be arranged in a honeycomb structure. Owing to the arrangement in the pinhole plane, each detector element itself acts as an individual, extremely small pinhole. Since the arrangement of the detector elements relative to one another is known, it is possible using calculation to generate, from the recorded intensity values, a high-resolution image having a resolution that is greater than the diffraction limit, compared to a laser scanning microscope having a pinhole of one Airy unit.

However, the high number of individual detectors—a typical Airyscan detector consists for example of 32 individual hexagonal detector elements—increases in particular the computational complexity in the acquisition of the overall image of the sample. Accordingly, more signals must be processed. For each scanned point P ($\vec{r}$, z), a number of H signals $D_h(\vec{r}, z)$ are detected, wherein H corresponds to the number of the detector elements. $\vec{r}$ denotes the lateral sample position, z denotes the axial sample position. The index h denotes the respective detector element.

During scanning, each of the detector elements captures a raw image of the sample, consisting of the signals $D_h(\vec{r}, z)$. The raw images differ from one another, wherein the differences are determined by the lateral distance of the illumination spot relative to the sample region detected by the respective detector element. The raw images are described mathematically by a convolution of the actual sample image $O(\vec{r}, z)$ with the point spread function also referred to as PSF—$I_h(\vec{r}, z)$ of the respective detector element h:

$$D_h(\vec{r},z) = I_h(\vec{r},z) * O(\vec{r},z).$$

The point spread functions $I_h(\vec{r}, z)$ are known to the system owing to its properties. They can be calculated from system parameters or be measured once and stored. In the known prior art, the signals of all detectors are transmitted to an evaluation unit outside the microscope, where an image $\tilde{O}(\vec{r}, z)$ is composed that corresponds as accurately as possible to the original of the sample $O(\vec{r}, z)$. This is accomplished by way of a deconvolution and a subsequent combining of the thus deconvolved raw images, wherein the processes deconvolution and combining can merge into one another in process-technological fashion.

This is shown for example in FIG. 3 of the not previously published German application DE 10 2017 122 858.6 and is described in connection therewith. The disclosure of this application is hereby incorporated in its entirety.

When scanning the sample, the displacements are smaller than the diameter of the illumination spot, with the result that the same locations in the sample are recorded by different individual detectors h. This, too, must be taken into account when generating the overall image of the sample. In order to generate the overall image of the sample in a section plane z, consequently not only the signals of the individual detector elements h must be included in a calculation, but they also need to be combined to form the image in the sample plane z. If for example 32 detectors are used, 32 raw data sets are produced, with each of the raw data sets corresponding to a detector element h. The raw data sets all have the same size, and differences in the intensity values in the pixels come about due to the relative lateral displacement of the detector elements in relation to one another or in relation to a central detector element, which serves as a reference element. The lateral displacement relative to the central detector element is thus always the same for every pixel in a raw data image.

In order to reduce the processing outlay and to already perform some of the processing "on-the-fly," that is to say during or directly after the recording still in the microscope and before the transmission of the data from the microscope to a control and evaluation unit, generally a PC, or after transmission to the control and evaluation unit without storing the raw data, it is possible to use precisely the fact that the individual raw image data sets—each raw image data set corresponds to one detector element of the area detector—differ from one another laterally, that is to say in the direction $\vec{r}$, substantially only by a displacement $s_h$.

This fact is used to generate a pre-calculated raw image having higher resolution. The displacements—referred to below as $s_h$—are a function of the point spread functions $I_h(\vec{r}, z)$ and can be calculated with relatively low outlay. The raw images are shifted back by the displacements $s_h$ and are subsequently added, specifically for each plane z independently of the others. The resulting pre-calculated raw image $\tilde{D}(\vec{r}, z)$ already has a higher resolution than would be possible based on diffraction and is referred to as a Sheppard sum:

$$\tilde{D}(\vec{r}, z) = \sum_h D_h(\vec{r} - \vec{s}_h, z)$$

This pre-calculated raw image, which can also be displayed for a user, possibly also contains artifacts that must be removed in a further processing step.

For example, if the sample is scanned line-wise bidirectionally in the form of a grid in rows and columns in a forward direction and in an opposite backward direction, then the recorded image rows for the forward and backward directions are slightly offset along the scanning direction for technical reasons related to the drive mechanism of the scanner. This offset can be determined on the basis of mutually overlapping data regions that must be correlated. This requires the transmission of all the raw image data sets to the control and evaluation unit. After the offset, also known as displacement, has been determined, the raw image data sets can be corrected by said displacements. Subsequently, the pre-calculated raw image is again determined as a Sheppard sum from the individual raw image data sets and subsequently also optionally freed from stripe-shaped artifacts (destriping). Ultimately, deconvolution with the point spread function $\tilde{I}(\vec{r}) = \sum_h I_h(\vec{r} - \vec{s}_h, z)$—this is advantageously done by computation in the Fourier domain, because convolution in the spatial domain corresponds to multiplication in the Fourier domain—is also performed, and the image of the sample is obtained. Regarding details of the calculation including taking into account a Wiener filter to suppress noise, reference is made to DE 10 2017 122 858.6.

The correction of these artifacts, which come about owing to the bidirectional scanning, is time-consuming, because first an overview raw image must be generated and then, subsequently, all the raw data must be corrected before once again a pre-calculated overview raw image is generated. This requires the transmission of large amounts of data from the microscope to the control and evaluation device and the processing thereof there and can noticeably slow the process up to the presentation of the image.

It is therefore the object of the invention to accelerate the recording and in particular the processing in particular with regard to the correction of the above-described artifacts on account of bidirectional scanning and to reduce the amounts of data required.

This problem is achieved in a method of the type described in the introductory part, in which the sample is scanned line-wise, in that for every recorded row, pre-calculated row raw images are calculated and the pre-calculated row raw images are combined and deconvolved to generate the image of the sample.

The pre-calculated row raw images are preferably calculated immediately after the recording of the respective row, that is to say already while the next row is scanned. In contrast to the prior art, no complete data sets with a multiplicity of rows and columns are then initially generated for each detector element, but the rows are considered separately from one another, which is possible in principle because the next step, the pre-calculation, that is to say the forming of the Sheppard sum in the coordinates of the image, is a linear operation which can be decomposed in principle in any desired number of individual steps. The forming of complete data sets and subsequent line-wise pre-calculation is of course likewise possible. It is also possible to initially record a plurality of rows, transmit them to the evaluation unit, and to calculate them there in line-wise fashion.

The pre-calculated row raw images can be combined in various ways before deconvolution. In the simplest case, all the row raw images are combined without further intermediate steps, that is to say the pixel-wise sum is formed from all the pre-calculated row raw images and in that way a raw image of the sample is generated, which can also be used as a preview image. This procedure is advantageous for example if the scanning is done in only one direction, i.e. unidirectionally, or in the case of line-wise multitracking. In the recording method that is also referred to as "line-wise multitracking," the sample is scanned for example in the forward scanning direction with a green laser (track 1) and in the backward direction with a red laser (track 2).

In a particularly preferred configuration, however, the rows are combined into groups which are mutually complementary. For each of the groups, a pre-calculated group raw image is composed from the pre-calculated row raw images, that is to say no further calculation takes place here, except that care must be taken that each row raw image in the group raw image is inserted at the correct row position. Optionally, it is additionally possible for corrections to be performed on the pre-calculated group raw images that affect the respective group raw image. A preview image can be generated by forming the pixel-wise sum of all group raw images. Since the rows are combined in mutually complementary groups, each row appears only once and only in one of the group raw images. The image of the sample is ultimately generated by combining the pre-calculated group raw images to form the raw image—without application of further corrections, this is the preview image—and performing a deconvolution, that is to say the pre-calculated row raw images are here combined via the intermediate step of the formation of group raw images. Combining the group raw images typically consists of the pixel-wise sum of the group raw images and the subsequent deconvolution with the corresponding, summed point spread function for all detector elements. Combining the rows into mutually complementary groups provides the possibility of applying a wide variety of corrections or modifications to entire groups of rows. For example, corrections with respect to the location or the brightness or signal strength can be applied if an offset or disturbance should arise between the rows. It is likewise possible to correct periodic disturbances in the signal.

A particular advantage arises if the sample is scanned bidirectionally, that is to say in a forward and in a backward direction. In that case, the rows in which the sample is scanned in the forward direction are combined into a first group and the rows in which the sample is scanned in the backward direction, that is to say which correspond to an image that is generated when scanning in the backward direction, are combined into a second group. The two group raw images are then correlated to one another on the basis of distinct structures, which are congruent except for an offset that is caused by the scanner, in the two group raw images to determine a relative displacement of the column positions in the image between the forward and backward scanning on the basis of said offset of the scanner. This displacement is then applied to one of the group raw images or to both in parts, for example in each case to half of it, to compensate for the offset due to the scanner. In the simplest case, this is then an operation that is applied equally to all elements, that is to say to all pixels in the group raw image. Under certain circumstances, however, the corrections to be applied can also be dependent on the position in the row, the x-coordinate. The correlation is brought about for example by analyzing specific structures, which are present in both group raw images and are dominant, in the group raw images in terms of their position in the image, from which a displacement can be determined.

The displacement is then corrected in the group raw images, and the thus corrected group raw images are then combined, as before, by pixel-wise summation to form the raw image and deconvolved. A preview image can be generated by the simple pixel-wise addition of the two pre-calculated group raw images. In the manner described above for correcting data, computation time is saved, and, in addition, the required data amounts can be reduced, and only the two pre-calculated group raw images need to be transmitted from the microscope to an evaluation unit connected thereto for further processing, such as for calculating the displacement.

This method is particularly suitable if the scanning is performed in what is known as the multiplex mode, that is to say not every row is scanned, but only every nth row, wherein n is preferably a natural number between 2 and 8, including the two endpoints. Higher values for n, such as 10, are also possible. n denotes what is known as the "line step." The resulting data sets then in each case contain exactly as many columns as the later image of the sample, but correspondingly fewer rows, which means that a data set—which is not stored in its entirety here is smaller than the data set of the finished image by between half and ⅞. The images are compressed in the direction in which the rows are omitted. Yet, interpolation is not necessary: The distance between the detector elements approximately corresponds to the distance between two rows in the image plane. The area detector consequently detects in principle a plurality of rows at the same time. In the multiplex mode, in the case of a "line step" of 8, the central detector element in the center of the area detector for example detects the first and the ninth row, etc. The next element detects approximately the second and the tenth row. When the Sheppard sum of the compressed images of the individual detector elements is formed, it contains all the rows.

The previously described procedure can of course also be combined with the method described in DE 10 2017 122 858.6 if the pixels of the area detector are divided into detector element groups having a central detector element group, located on an optical axis, and at least one further detector element group that surrounds the central detector element group. A pre-calculated row raw image is then calculated for each of the detector element groups, which row raw images are then combined, as before, which does not reduce the resolution in the axial z-direction.

It is understood that the features specified above and the features yet to be explained below can be used not only in the specified combinations, but also in other combinations or on their own, without departing from the scope of the present invention.

BRIEF DESCRIPTION OF THE DRAWINGS

The invention is explained in even greater detail below for example with reference to the accompanying drawings, which also disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments can also contain alternative elements and components, fewer elements or components or additional elements or components. Elements or components of different exemplary embodiments can be combined with one another, unless stated otherwise. Modifications or variations, which are described for one of the exemplary embodiments, can also be applicable to other exemplary embodiments. To avoid repetitions, the same or corresponding elements in different figures are denoted by the same reference signs and are not explained multiple times. In the figures.

DETAILED DESCRIPTION OF THE DRAWINGS

Figure 1:
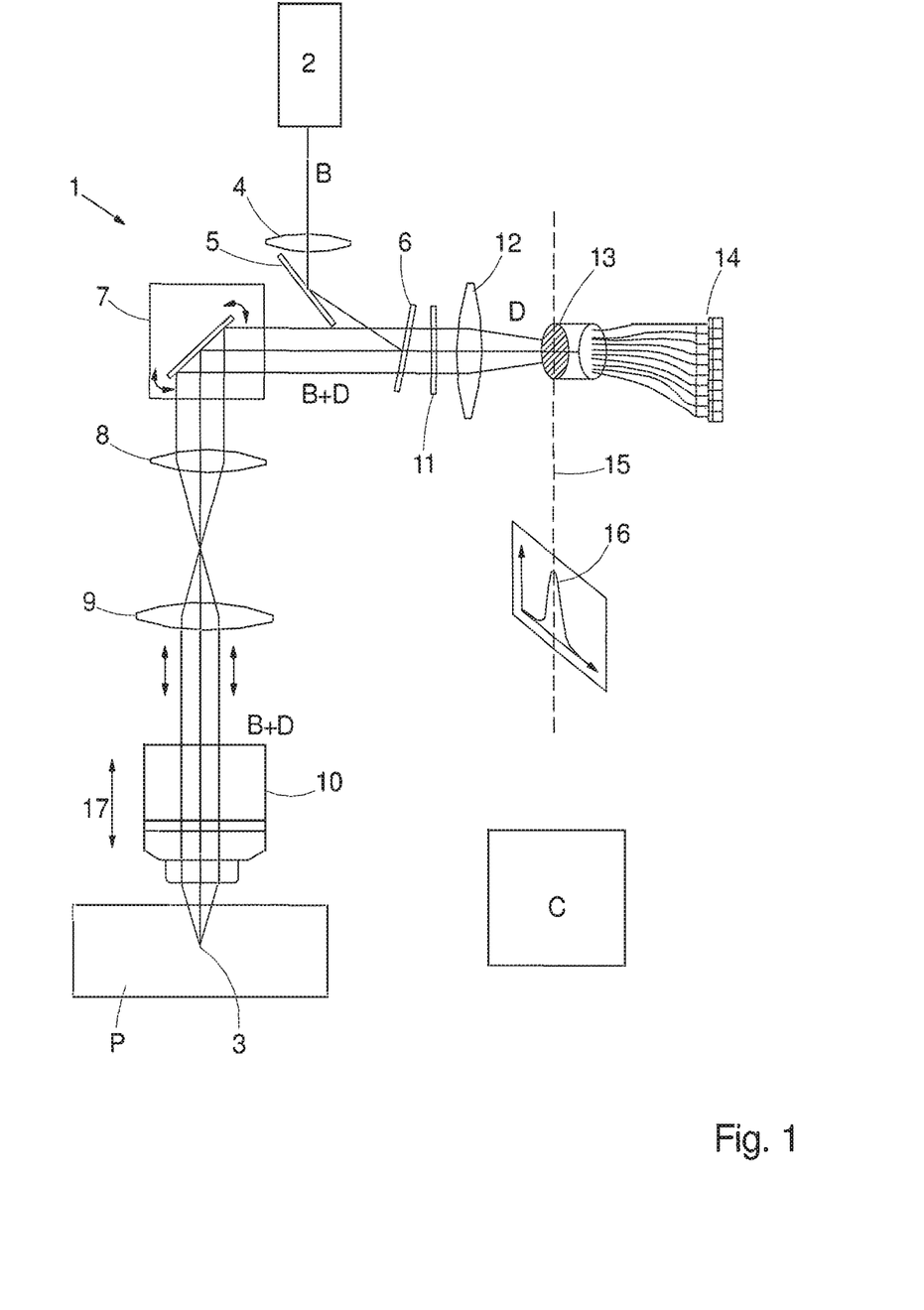
FIG. 1 is a schematic diagram of a microscope for high-resolution microscopy.

FIG. 1 schematically shows a confocal microscope 1 with a high resolution, i.e. a resolution which is increased beyond the diffraction limit in accordance with the principle of so-called Airyscans, as is known e.g. from EP 2 317 362 A1. It has a light source 2 for illuminating a sample P with an illumination spot 3. Illumination light B is guided via a beam shaping means 4 and a mirror 5 to a beam splitter 6. The beam splitter 6 is embodied such that it reflects as much of the illumination light B as possible and guides it to a scanner 7. The illumination light B is guided, from the scanner 7, via further beam shaping optical units 8 and 9 to an objective 10. The objective 10 focuses the illumination light B onto the sample P into the illumination spot 3.

The detection light D produced by the sample P in the illumination spot 3 is collected by the objective 10 and guided, on the reverse path with respect to the illumination light B, to the beam splitter 6. The beam splitter 6 is embodied such that it transmits as great a portion as possible of the detection light D. The detection light D thus transmitted by the beam splitter 6 is passed to an area detector 13 via a further filter 11 and a further beam shaping optical unit 12. The area detector 13 is arranged in what is known as the pinhole plane and detects the detection light D, generates electrical signals therefrom and passes them on, via conductors 14, to a control and evaluation device C, e.g., to a computer. In this way, a diffraction image 15 is recorded, which is diffraction-limited, as a diffraction structure 16 demonstrates.

In order to obtain an image of the sample P, the illumination spot 3 is moved with the scanner 7 in point-wise fashion over the sample P. From the point-wise sample signals thus obtained, an image of the sample which can be presented e.g. on a monitor is composed by the control and evaluation device C. The scanner 7 here permits the recording of a two-dimensional image which extends laterally, that is to say in a plane perpendicular to the optical axis of the objective 10. For a three-dimensional image recording, the distance 17 of the objective 10 relative to the sample P is varied and a two-dimensional image of the sample P is recorded at each distance 17. The control and evaluation device C can combine the thus acquired signals to form a three-dimensional image.

Figure 2A:
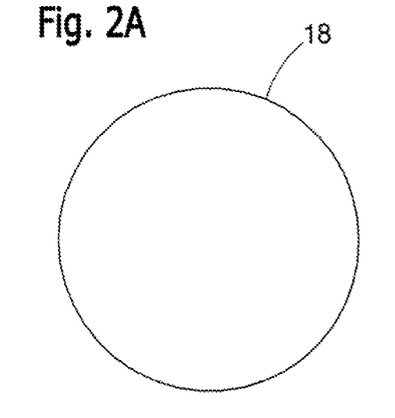
FIG. 2A illustrates a conventional detector having a single sensitive surface in FIG. 1.
Figure 2B:
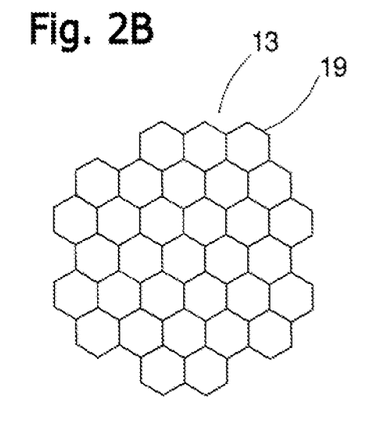
FIG. 2B illustrates a plurality of detector elements, or pixels.
Figure 2C:
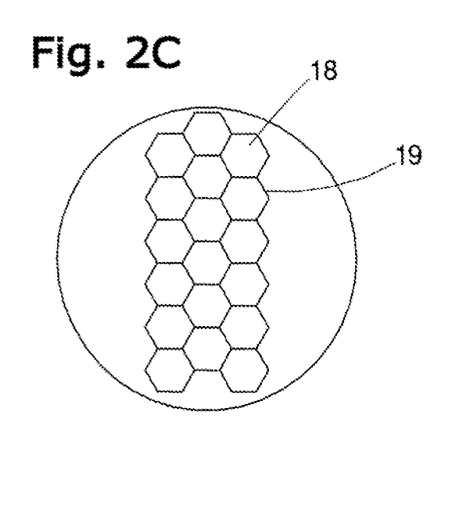
FIG. 2C illustrates need to be switched on; a selection of detector elements which are switched on, FIG. 3 shows a plurality of compressed data sets, in which only every eighth row is detected.

FIGS. 2a)-c) schematically illustrate detectors of a confocal microscope. FIG. 2A shows a conventional detector having a single sensitive surface 18. To achieve the high resolution, the area detector 13 of the confocal microscope 1 has a plurality of detector elements, or pixels, 19, as are shown in FIG. 2B The arrangement shown here by way of example has 32 detector elements 19.

The size of the detector elements 19 is chosen such that they are significantly smaller than the diffraction image 15 that is generated on the area detector 13. At the same time, the number of the detector elements 19, and consequently the entire surface of the area detector 13, is chosen such that a significant portion of the detection light D can be detected for the diffraction image 15. The detector elements 19 are embodied in the example hexagonally or in the shape of honeycombs and correspondingly form an affine grid with an angle of 60°.

For comparison reasons, FIG. 2A indicates a detector with only one detection element and one sensitive surface 18. Such a detector would be used for a confocal microscope of typical resolution. The sensitive surface 18 in this case covers a large portion of the diffraction image 15. The term "typical resolution" is to be understood here to mean that the Abbe criterion applies to the resolution achieved. By contrast, in the confocal microscope 1 having increased resolution, the illumination and the detection act together such that theoretically twice as high a resolution can be achieved. In practice, the resolution increase is slightly lower, because structures near the resolution limit can be transmitted only with very poor contrast. Resolutions of up to approximately 1.7 times the Abbe criterion can also be achieved in reality.

The area detector 13 of the confocal microscope 1 with high resolution captures for each scanned point $P(\vec{r}, z)$ a multiplicity of detected signals $D_h(\vec{r}, z)$ corresponding to the number of the detector elements 19. $\vec{r}$ denotes the lateral sample position, z denotes the axial sample position, and the index h denotes the respective detection element 19.

The area detector 13 captures a raw image signal of the sample consisting of the individual signals $D_h(\vec{r}, z)$. The individual raw image signals differ from one another, wherein the differences are determined by the lateral distance of the illumination light spot 3 relative to the sample region detected by the respective detector element 19. The raw image signals are described mathematically by a convolution of the actual sample image $O(\vec{r}, z)$ with the point spread function PSF $I_h(\vec{r}, z)$ of the respective detector element h:

$$D_h(\vec{r},z)=I_h(\vec{r},z)*O(\vec{r},z)$$

It is intended to compose an image $\tilde{O}(\vec{r}, z)$ from all $D_h(\vec{r}, z)$ that corresponds to the original of the sample $O(\vec{r}, z)$ as accurately as possible. This is accomplished in principle by a deconvolution—for example taking into account a Wiener filter or the pure Sheppard sums—wherein the processes deconvolution and combining can transition into one another in terms of the process, and wherein the evaluation in the present case will be such that the data transfer to the evaluation unit C is kept as low as possible, as is the accumulated data amount in the microscope. In addition, other methods can be used for correcting the band-limited scanning processes. Iterative methods such as what is known as "Lucy-Richardson deconvolution" are one example.

In the procedure described below, the sample P is scanned line-wise in a grid of rows. For every row recorded, a pre-calculated row raw image is preferably calculated directly after or even during the recording. Finally, the pre-calculated row raw images are combined into a raw image of the sample and deconvolved to generate the image of the sample P.

Figure 3:
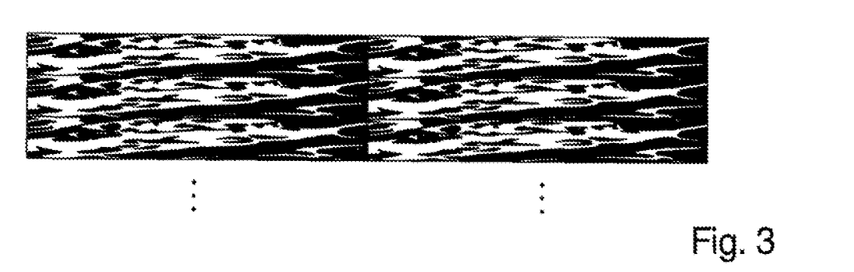

During scanning, not all detector elements 19 need to be switched on; a selection of said elements can be switched on instead. In FIG. 2C, such a selection of 18 detector elements 19 in total is shown. In multiplex recordings, this shape approximately corresponds to the illumination profile of the excitation point spread function. Further selection criteria are the resolution at depth z and/or the avoidance of stripe-shaped artifacts in the raw image. In the example described below, in addition only every eighth row is scanned, which would as a final result provide raw data for compressed images, as shown by way of example in FIG. 3; the dots indicate that there are more images here, specifically as many as detector elements 19 are actively used. FIG. 3 only serves to illustrate that rows are omitted in the recording, when, in reality, these data sets are not produced because the pre-calculation has already been done during the recording, that is to say for each recorded row. However, the data sets can also be recorded first and be calculated as described further below. The recorded raw data can subsequently be deleted. Instead of every eighth line—this refers to the image—other distances can be selected, in particular smaller distances, where for example the sample is scanned for every second row. It is likewise possible to scan each row of the sample.

In the considered example, the rows are additionally combined into mutually complementary groups. For each of the groups, a pre-calculated group raw image is composed from the pre-calculated row raw images, and the image of the sample P is then generated by combining the pre-calculated group raw images to form the raw image and performing a deconvolution. In the example, the sample is scanned bidirectionally, alternately in a forward and its opposite backward direction. In that case, the rows in which the sample is scanned in the forward direction are combined into a first group and the rows in which the sample is scanned in the backward direction are combined into a second group. A row is consequently assigned to a group on the basis of the scanning direction. If only every eighth row is considered, as in the present example, no overlap of the scanning regions in the vertical direction occurs, which means that the row raw images can in fact be considered independently from one another. It is possible, as an alternative, to initially record complete data sets from compressed images and to then calculate the group raw images from said data sets. In either method, the pre-calculation is effected by forming the Sheppard sum, which for a location r in the sample P in a specific sample plane z is:

$$D(\vec{r},z)=\Sigma_h D_h(\vec{r}-\vec{s}_h,z)$$

Figure 4:
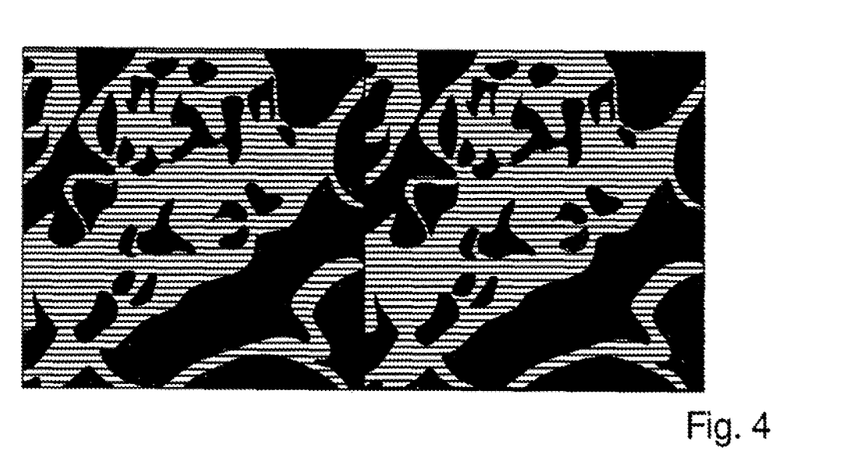
FIG. 4 shows an intermediate step in the determination of an image in the case of the sample.

As a result, the two data sets illustrated in FIG. 4 are obtained, the left one for example for the rows scanned in the forward direction and the right one for the complementary rows scanned in the backward direction. The combination of the two images as a simple pixel-wise sum generates a raw image, which can already be represented to a user as a preview image for planning further steps. The two pre-calculated group raw images which in each case contain the Sheppard sums for the rows which were recorded in the forward direction and in the back direction are stored, while the raw data of the individual rows or of the individual compressed data sets can be immediately deleted.

Figure 5:
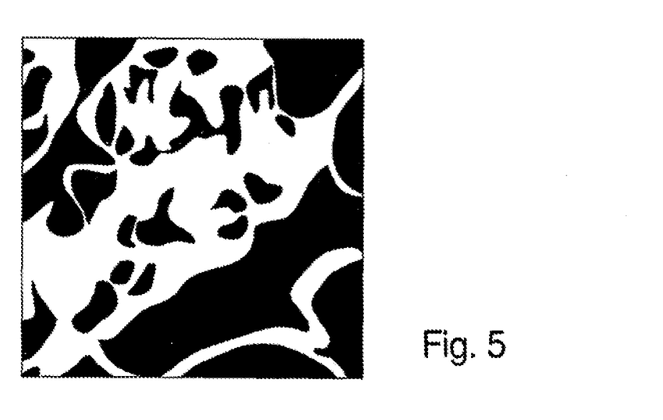
FIG. 5 shows the final image of the sample.

The raw image of the sample generated from the pixel-wise additive superposition of the two group raw images, however, does not yet correspond to the actual image of the sample since it contains artifacts, specifically displacements along the rows between the rows that were sampled in the forward direction and the rows that were sampled in the backward direction, on account of a technology-based offset of the scanner that occurs when switching between the scanning directions. Said displacements are determined on the basis of the two group raw images, for which purpose they are correlated. The displacement in the x-direction, that is to say along the row, can be determined on the basis of the correlation, that is to say the difference between the actual position of the scanner and the expected one. Once the displacement has been determined, the group raw images can be corrected for example by displacing the two data sets in each case by half of the calculated correction in opposite directions toward one another. The displacement of only one data set is also possible in principle, but the distortion or—with a temporal change of the correction—the change therein remains visible in the image. These steps are typically performed on a PC, after the two pre-calculated group raw images have been transferred to the PC from the microscope. The two group raw images are combined after the correction to form a raw image of the sample, that is to say added pixel-wise and without further computation operations. Subsequently, the raw image is also deconvolved to generate the image of the sample P shown in FIG. 5. This is done in a way as is described for example in the not previously published German application number 10 2017 122 858.6.

With the previously described procedure, fewer data are generated and the calculation of the images is simplified, thus accelerating the process from the recording of the raw data up to the generation and representation of the corrected image.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Confocal microscope
2 Light source
3 Illumination spot
4 Beam shaper
5 Mirror
6 Beam splitter
7 Scanner
8, 9 Beam shaping optical unit
10 Objective
11 Filter
12 Beam shaping optical unit
13 Area detector
14 Conductor
15 Diffraction image
16 Diffraction structure
17 Distance
18 Sensitive surfaces
19 Detector element
B Illumination light
C Control and evaluation unit
D Detection light
P Sample

What is claimed is:
1. A method for high-resolution scanning microscopy of a sample, comprising:
illuminating the sample with illumination light, wherein the illumination light is focused at a point in or on the sample to form an illumination spot having a diameter;
imaging the point into a diffraction image onto an area detector having detector elements, wherein, owing to its detector elements, the area detector has a spatial resolution that resolves a diffraction structure of the diffraction image;
scanning the sample line-wise in a grid formed by rows and columns by displacing the point relative to the sample into different scanning positions with an increment width that is smaller than the diameter of the illumination spot;
reading the area detector, and generating an image of the sample from data of the area detector and from the scanning positions assigned to said data, said image having a resolution that is increased beyond a resolution limit for imaging;

calculating pre-calculated row raw images for each recorded row; and combining the pre-calculated row raw images to form a raw image and are deconvolved to generate the image of the sample.

2. The method as claimed in claim 1, wherein the rows are combined into mutually complementary groups, a pre-calculated group raw image is composed for each of the groups from the pre-calculated row raw images, and the image of the sample is generated by combining the pre-calculated group raw images to form the raw image and performing a deconvolution.

3. The method as claimed in claim 2, wherein the sample is scanned bidirectionally in a forward and a backward direction and the rows in which the sample is scanned in the forward direction are combined into a first group and the rows in which the sample is scanned in the backward direction are combined into a second group.

4. The method as claimed in claim 3, wherein two group raw images are correlated to compensate for a displacement of a column position in the image occurring in a case of switching of the scanning direction, the displacement is determined on a basis of the correlation, and the displacement in the group raw images is corrected.

5. The method as claimed in claim 1, wherein only every nth row is scanned, with n being a natural number between 2 and 8 inclusive.

6. The method as claimed in claim 1, wherein the detector elements of the area detector are divided into detector element groups that have a central detector element group, located on an optical axis, and at least one further detector element group that surrounds the central detector element group in a form of a ring, a pre-calculated individual raw image is calculated for each detector element group, and the pre-calculated individual raw images are combined to form the row raw images.

\* \* \* \* \*

UNITED STATES PATENT AND TRADEMARK OFFICE
CERTIFICATE OF CORRECTION

PATENT NO. : 11,300,767 B2
APPLICATION NO. : 16/823624
DATED : April 12, 2022
INVENTOR(S) : Stanislav Kalinin et al.

It is certified that error appears in the above-identified patent and that said Letters Patent is hereby corrected as shown below:

In the Specification

Column 7, Line 44     now reads: "shown in FIG. 2B The arrangement shown here by way of"
should read -- shown in FIG. 2B. The arrangement shown here by way of --

Column 9, Line 26     now reads: "r in the sample P in a specific sample plane z is:"
should read -- $\vec{r}$ in the sample P in a specific sample plane z is: --

Column 9, Line 28     now reads: "$D(\vec{r}, z) = \sum_h D_h(\vec{r} - \vec{s}_h, z)$"
should read -- $\tilde{D}(\vec{r}, z) = \sum_h D_h(\vec{r} - \vec{s}_h, z)$ --

Signed and Sealed this
Twenty-first Day of June, 2022

Katherine Kelly Vidal
*Director of the United States Patent and Trademark Office*